(12) United States Patent
Livingston et al.

(10) Patent No.: US 10,776,000 B2
(45) Date of Patent: Sep. 15, 2020

(54) SYSTEM AND METHOD OF RECEIVING AND CONVERTING DIGITAL INK INPUT

(71) Applicant: MICROSOFT TECHNOLOGY LICENSING, LLC, Redmond, WA (US)

(72) Inventors: Elise Leigh Livingston, Seattle, WA (US); Patrick Edgar Schreiber, Sammamish, WA (US); Tracy ThuyDuyen Tran, Seattle, WA (US); Heather Strong Eden, Bellevue, WA (US); Rachel Ann Keirouz, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 16/226,601

(22) Filed: Dec. 19, 2018

(65) Prior Publication Data
US 2020/0201532 A1    Jun. 25, 2020

(51) Int. Cl.
| | |
|---|---|
| G06K 9/62 | (2006.01) |
| G06F 3/0488 | (2013.01) |
| G06F 3/0485 | (2013.01) |
| G06K 9/22 | (2006.01) |
| G06F 40/171 | (2020.01) |

(52) U.S. Cl.
CPC ........ *G06F 3/04883* (2013.01); *G06F 3/0485* (2013.01); *G06F 3/04886* (2013.01); *G06F 40/171* (2020.01); *G06K 9/222* (2013.01)

(58) Field of Classification Search
CPC combination set(s) only.
See application file for complete search history.

(56) References Cited

U.S. PATENT DOCUMENTS

| | | |
|---|---|---|
| 6,897,851 B2 | 5/2005 | Carini et al. |
| 7,692,636 B2 | 4/2010 | Kim et al. |
| 8,064,702 B2 | 11/2011 | Markiewicz et al. |
| 8,116,570 B2 | 2/2012 | Vukosavljevic et al. |

(Continued)

FOREIGN PATENT DOCUMENTS

EP    2767894 A1    8/2014

OTHER PUBLICATIONS

Vilar, et al., "A Flexible System for Document Processing and Text Transcription", In Proceedings of 13th Conference on Spanish Association for Artificial Intelligence, Nov. 9, 2009, pp. 291-300.

(Continued)

*Primary Examiner* — Deeprose Subedi
(74) *Attorney, Agent, or Firm* — NovoTechIP International PLLC

(57) ABSTRACT

A method of and system for receiving, processing, converting and verifying digital ink input is carried out by receiving digital ink input, collecting data relating to the received digital ink input, and receiving a request to convert the received digital ink input. Upon receiving the request, the received digital ink input may be recognized as text characters based at least in part on an analysis of the digital ink input and the converted characters may be displayed on a screen adjacent to the received digital ink input, at which point a user may be able to compare the received digital ink input with the recognized characters to initiate any corrections needed.

20 Claims, 7 Drawing Sheets

(56) References Cited

U.S. PATENT DOCUMENTS

| | | |
|---|---|---|
| 2005/0135678 A1 | 6/2005 | Wecker et al. |
| 2006/0159345 A1 | 7/2006 | Clary et al. |
| 2008/0235577 A1 | 9/2008 | Veluchamy et al. |
| 2008/0260240 A1* | 10/2008 | Vukosavljevic ... G06K 9/00436 382/159 |
| 2011/0060985 A1 | 3/2011 | Kerr et al. |
| 2014/0344662 A1 | 11/2014 | Isabel et al. |
| 2016/0179364 A1 | 6/2016 | Nicholson et al. |
| 2016/0180160 A1 | 6/2016 | Vanblon et al. |
| 2017/0199660 A1* | 7/2017 | Guiavarc'h ......... G06F 3/04883 |
| 2017/0315634 A1 | 11/2017 | Koyama et al. |
| 2018/0004406 A1 | 1/2018 | Jung et al. |
| 2018/0089412 A1 | 3/2018 | Kopikare et al. |
| 2020/0201533 A1 | 6/2020 | Schreiber et al. |

OTHER PUBLICATIONS

"International Search Report and Written Opinion issued in PCT Application No. PCT/US19/065569", dated Mar. 11, 2020, 13 Pages.

"International Search Report and Written Opinion Issued in PCT Application No. PCT/US2019/065570", dated Mar. 26, 2020, 14 Pages.

"Non Final Office Action Issued in U.S. Appl. No. 16/226,619", dated Apr. 14, 2020, 16 Pages.

\* cited by examiner

Personal Health History

Name: _____ 105A

Date of Birth: _____ 110A

Are you currently taking any medications? ☐ Yes 230A ☐ No 235A — 120A

If so, please provide the names: _____ — 125A

Ink Tool — 140

SYSTEM AND METHOD OF RECEIVING AND CONVERTING DIGITAL INK INPUT

TECHNICAL FIELD

This disclosure relates generally to providing an improved user interface for use with digital ink and, more particularly, to an improved method of and system for providing a user interface that enables receiving, converting and verifying digital ink input.

BACKGROUND

Many recently developed computer devices have the ability to receive digital ink as a form of input. The digital ink may include one or more handwritten strokes, which the device may display as ink as the one or more handwritten strokes are entered. To receive the handwritten strokes, the device may provide a writing surface, which could for example be the same as the display screen so that the user can view the ink as he/she writes. A handwritten stroke may begin when a writing instrument lands on the writing surface and may end when the writing instrument is lifted off the writing surface. The writing instrument may be an electronic or non-electronic pen, a stylus, the user's own finger, a pointing device, such as, for example, a computer mouse, or any another writing instrument.

To make use of the entered digital ink, many devices offer an ability to recognize the handwriting and convert it to computerized characters. However, currently used programs for recognizing and converting digital ink have many limitations. For example, they are error-prone, thus often requiring many corrections. Moreover, the user interface screens used for presenting the entered digital ink and/or the converted text have many shortcomings.

Hence, there is a need for improved systems and methods for providing a user interface for receiving, converting and verifying digital ink input.

SUMMARY

In one general aspect, the instant application describes a device having one or more processors, and a memory in communication with the processors where the memory comprises executable instructions that, when executed by the processors, cause the device to perform multiple functions. The function may include receiving digital ink input in a digital ink enabled document, collecting data relating to the received digital ink input, determining that digital ink input entry into the document is complete, upon determining that digital ink input entry into the document is complete, recognizing the received digital ink input as one or more text characters based at least in part on the received digital ink input, displaying the one or more recognized text characters as converted characters on a screen adjacent to the received digital ink input, and enabling corrections to be made to at least one of the converted text characters or the received digital ink input to correct a misrecognized character.

In yet another general aspect, the instant application describes a method for providing digital ink input processing, where the method includes the steps of receiving digital ink input in a digital ink enabled document, collecting data relating to the received digital ink input, determining that digital ink input entry into the document is complete, upon determining that digital ink input entry into the document is complete, recognizing the received digital ink input as one or more text characters based at least in part on the received digital ink input, displaying the one or more recognized text characters as converted characters on a screen adjacent to the received digital ink input, and enabling corrections to be made to at least one of the converted characters or the received digital ink input to correct a misrecognized character.

In a further general aspect, the instant application describes a non-transitory computer readable medium on which are stored instructions that when executed cause a programmable device to receive digital ink input in a digital ink enabled document, collect data relating to the received digital ink input, determine that digital ink input entry into the document is complete, upon determining that digital ink input entry into the document is complete, recognize the received digital ink input as one or more text characters based at least in part on the received digital ink input, display the one or more recognized text characters as converted characters on a screen adjacent to the received digital ink input, and enable corrections to be made to at least one of the converted characters or the received digital ink input to correct a misrecognized character.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1A depicts an example user interface (UI) screen displaying a document containing one or more objects that can receive digital ink input.

DETAILED DESCRIPTION

Figure 1B:
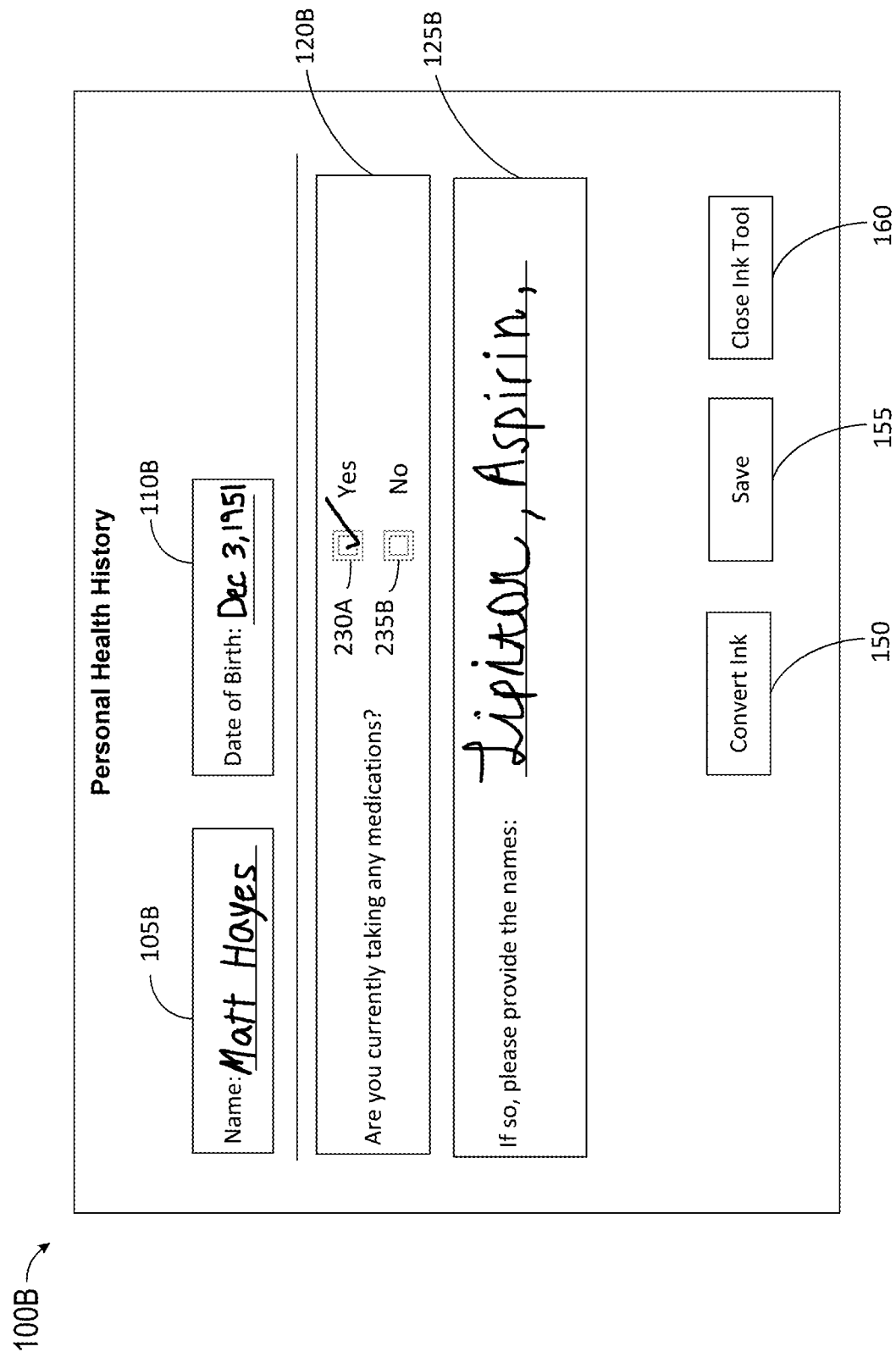
FIG. 1B depicts an example UI screen where digital ink input has been used to fill in various objects of the UI screen of FIG. 1A.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Digital ink has become popular in recent years as a form of input to many computer devices. This may be partly because research has shown that there are many cognitive benefits to using a writing instrument to write. However, to make use of the data entered as digital ink in one or more computerized processes, the data would generally need to be converted to computerized characters. For example, digital ink may be used as a form of input to take notes during a meeting. However, if the user desires to use some of those notes in another document (e.g., an email or Word® document), he/she may want to convert the notes to computer characters so they are more readable and can be more easily formatted. This is often done as the user is writing on the writing surface. For example, as the user is writing, a portion of the screen may be dedicated to displaying the converted characters. This is often distracting, inefficient and detracts from the cognitive benefits of writing. Moreover, because handwriting styles vary widely between individuals, currently used conversion algorithms produce many errors which may require the user to spend time and energy correcting the conversion. However, currently used techniques do not provide an easy or efficient method to compare the converted text with the original digital ink (particularly in bulk). Moreover, they do not provide an easy way to correct conversion mistakes. Thus, currently used forms of converting digital ink and presenting the converted text are inefficient, error-prone, and not user-friendly.

To address these issues and more, in an example, this description provides an improved user interface and method of receiving, processing, converting and verifying digital ink input. The improved user interface may provide an ability to enter all the desired digital ink on a document before it is converted. This may help avoid confusion and distraction and assist in preserving the cognitive benefits of using a writing instrument to write. To enable efficient verification of the converted text, an improved user interface may be presented that provides the original digital ink side by side with the converted text. This may be provided in a scrollable split-screen design where the two sides can be scrolled together to enable easy comparison between the two screens. To improve the current methods of converting digital ink, various writing instrument signals may be received, stored and analyzed along with the digital ink to better understand the handwriting. Furthermore, correction data may be collected, stored and analyzed to improve the recognition algorithms for the user making the correction and/or for other users who use the ink recognition service.

As will be understood by persons of skill in the art upon reading this disclosure, benefits and advantages provided by such implementations can include, but are not limited to, a solution to the technical problems of having an inefficient, time-consuming and error-prone process of converting digital ink and correcting errors in conversion. Technical solutions and implementations provided here optimize and improve the process of converting digital ink and correcting errors in conversion. The benefits provided by these solutions include providing increased accuracy, efficiency and usability in using digital ink as a form of writing on a computing device.

FIG. 1A depicts an example UI screen 100A displaying a document containing one or more objects that can receive digital ink input. The screen 100 may include textboxes 105A, 110A, and 125A, and a box 120A containing two checkboxes 130A and 135A. The textboxes 105A, 110A, and 125A and checkboxes 130A and 135A may be configured to receive various types of input. For example, each textbox may be configured to receive input through a keyboard, digital ink, voice input, or any other type of input mode available via the device displaying the screen 100A. In one implementation, to start using digital ink as a form of input, the ink tool button 140 may be pressed. Once pressed, the UI screen may become adaptable to recognize and receive digital ink input. The input may be provided by a variety of writing instruments, such as an electronic or non-electronic pen, stylus, finger, a pointing device, for example, a computer mouse, or any another writing instrument. One or more of these writing instruments may be used to make writing strokes on a writing surface. The writing surface may be provided on the same device that is displaying the UI screen 100A. For example, the screen may be a touch-enabled screen upon which the user can write using a writing instrument. Alternatively, the user may simply use a pointing device such as a computer mouse to insert digital ink.

It should be noted that although the screen 100A is displayed as having a variety of input boxes for receiving digital ink, such objects are not required for inserting digital ink into a document. Various types of applications may be configured to provide a digital ink feature where a user can insert digital ink into one or more parts of a document generated by the application. For example, a word processing application may provide a digital ink feature where the user can write an entire document using digital ink input. An application that provides the digital ink feature may be linked with or may include digital ink recognition features.

FIG. 1B depicts an example UI screen 100B where digital ink input has been used to fill in various input boxes of the screen 100A. For example, digital ink input was used to fill in the textbox 105B with the name of the user. Similarly, digital ink input was used to fill in the date of birth and name of medications, respectively, in textboxes 110B and 125B. A digital ink indication was also used to check the checkbox 230B from among the two checkboxes 230B and 23dB of block 120B. Since the user interface has been used to enter digital ink input, the screen 100B also includes convert ink button 150 for converting the inserted digital ink. In one implementation, this may be used by the user at any point during the user's use of the application. For example, the user may decide he/she wants to review a portion of the document before moving forward to determine, for example, if his/her handwriting is legible to the ink conversion tool. In such a case, the user may press the convert ink button 150 before he/she has finished entering data. Alternatively, the user may choose to enter the entire data in digital ink before he/she proceeds to initiate conversion. This gives the user the flexibility to choose when to convert based on the user's specific needs and desires. In one implementation, once the user presses the convert ink button 150 and reviews the conversion, he/she may go back to entering more data using digital ink or any other type of data. Screen 100B may also include a save button 155 for storing the document in its current form and a close ink tool to close the digital ink input tool and return to entering data in a format different from digital ink (e.g., via a keyboard).

Figure 2:
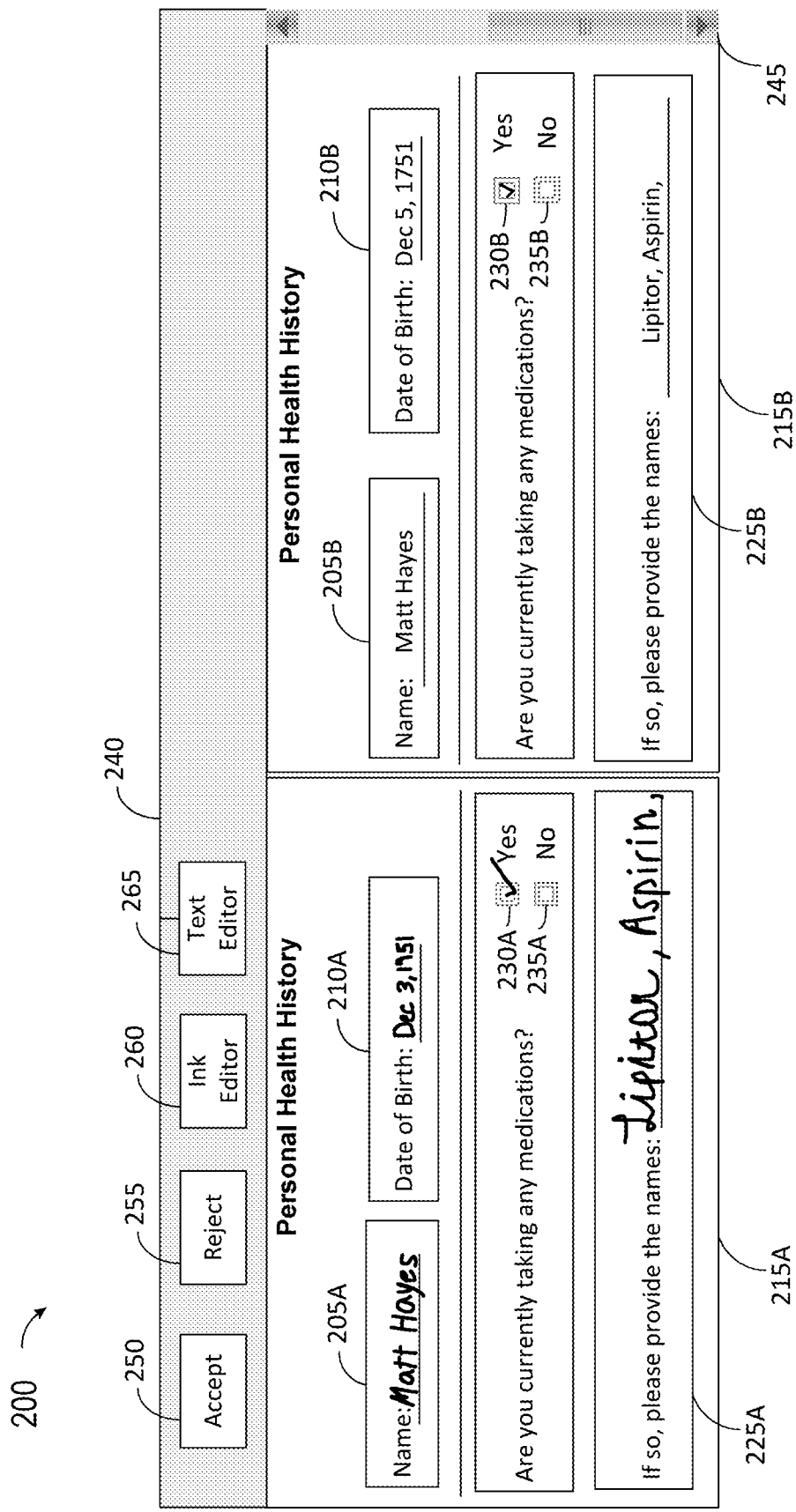
FIG. 2 depicts an example UI screen for displaying the original digital ink input alongside the converted text in a split-screen format.

When the convert ink button 150 is pressed, a digital ink recognition and conversion algorithm may be used to recognize and convert the digital ink entered into the document. Subsequently, the converted text may be displayed alongside the original input to enable the user to easily verify the conversion. This is illustrated in FIG. 2 which depicts an example UI screen 300 for displaying the original digital ink input alongside the converted text in a split-screen format.

The UI screen 200 includes a portion 215A displaying the document with the original digital ink input and a portion 215B displaying the same document with the digital ink input converted. This split-screen view enables the user to clearly see each portion of the converted text next to the digital ink input from which it was converted to easily compare the two for mistakes. For examples, textboxes 205A and 210A with digital ink input of the user's name and data of birth are displayed next to textboxes 205B and 210B with converted text. Similarly, checkboxes 230A and 235A are displayed next to checkboxes 230B and 235B and textbox 225A is displayed adjacent to textbox 225B. This enables the user to review the entire document all at once, thus preserving continuity in the user's writing and improving his/her overall experience. This is in contrast to previous digital ink conversion techniques where digital ink input is converted as it is being entered.

To enable easier navigation and verification, the screen 200 may also include a scroll bar 245 which can be used to scroll both portions 215A and 215B together. In this manner, the user can easily move through the document to verify all of the converted text. By allowing the user to finish writing and then initiating conversion, the improved method of receiving, processing, converting and verifying digital ink input provides continuity of thought and prevents distraction. This is because the user is not constantly distracted with having to check the converted text while using a writing instrument to write. Furthermore, the user can review and verify the entire document at one time which may allow the user to catch mistakes better and in a more efficient manner. Converting the entire document at the same time also allows the digital ink recognition and conversion algorithms to take into account the context of the writing as discussed further below.

Because human handwriting varies significantly in size and style, any digital ink recognition and conversion algorithm may provide misrecognized characters at times. When this happens, the user may desire to correct the mistake. To achieve this, the screen 200 includes a digital ink toolbar 240 which includes an accept button 250 for accepting the converted text, a reject button 255 for rejecting the converted button, an ink editor button 260 for editing the input as needed, and a text editor button 265 for editing the converted text. The accept button 250 may be used when the user determines that there are no mistakes in the converted input and/or any mistakes can be disregarded. In such instance, the application may store the converted text. In one implementation, pressing the accept button 250 may take the user back to the screen 100B of FIG. 1B to enable further modifications to the document, saving the document using the save button 155 or closing the ink tool using the close ink tool button 160. Alternatively, upon pressing the accept button 250 the user may be taken to a UI screen 200B which displays the converted text portion 215B. This UI screen may enable the user to make further changes to the document using one or more types of input (e.g., keyboard, digital ink, etc.).

A user may decide to press the reject button 255, when some of the converted characters are wrong. For example, when the user determines that it may take more time for the user to correct the misrecognized characters than to go back and reenter the characters using a different type of input. In such an instant, upon pressing the reject button 255, the user may be taken back to the screen 100B of FIG. 1B to modify the entered data. In one implementation, upon pressing the reject button 255, the user may be presented with an option to reset the document (e.g., delete all the digital ink input). This may be presented to the user via a message (e.g. a popup message) or may be provided as a button in the toolbar.

When the user notices a few misrecognized characters that the user may desire to correct, he/she may press the ink editor button 260 to correct the mistakes using digital ink input. In such an instant, upon pressing the ink editor button 260, the digital ink input in the portion 215A of the screen 200 may become selectable. For example, the user may be able to use a writing instrument to circle a misrecognized character. In one implementation, once selected, the program may delete the misrecognized character and allow the user to reenter the data. In another implementation, the user may be able to delete misrecognized characters using pen gestures. For example, strikethrough may be used to delete one or more misrecognized characters. In such an instant, the user may use the writing instrument to strikethrough the misrecognized characters to cause them to be deleted from the document. Other pen gestures may be used to initiate other modifications. For example, an inverted V may be drawn in between characters to create more space for writing or a line may be drawing between two characters to create one space between the characters. Many other gestures for modifying the digital ink are contemplated. In an alternative implementation, selecting a misrecognized character or word (e.g., by drawing a circle around it) may bring up a menu presenting alternative characters to choose from for conversion.

In the example provided in screen 200, the date of birth entered in digital ink as Dec. 3, 1951 has been misrecognized as Dec. 5, 1751. To correct this, the user may press the ink editor button 260 to initiate ink editing and then choose to delete the numbers 3 and 9 and redraw them using digital ink. In one implementation, when the digital ink input is modified on the portion 215A of the screen 200, portion 215B is automatically modified to correspond to the modified digital ink input. For example, when 3 is deleted from textbox 210A before entering it again, the portion 215B may also delete 5 from the textbox 210B. Alternatively, the user may be able make all the changes needed before pressing a button (e.g., close ink editor) that would cause changes to be made to the converted text in the portion 215B.

In some cases, instead of using the ink editor tool, the user may desire to make any needed changes directly in the converted text. This may be desirable, for example, when there are too many mistakes or when the user has already tried correcting a misrecognized character with no luck. In such cases, the user may press the text editor button 265 to enable editing the text in the portion 215B of the screen 200. Once pressed, the text editor button 265 may make one or more parts of the converted text in the portion 215B selectable and/or modifiable. The text may be changed using a keyboard or any other device that is used to directed enter computerized characters into a device. For example, the user may be able to click on the textbox 210B to delete the converted text and enter the correct one. In this manner, the example UI screen provides a user-friendly interface for reviewing and verifying conversion of digital ink input, while enabling the user to easily make corrections when needed.

Figure 3:
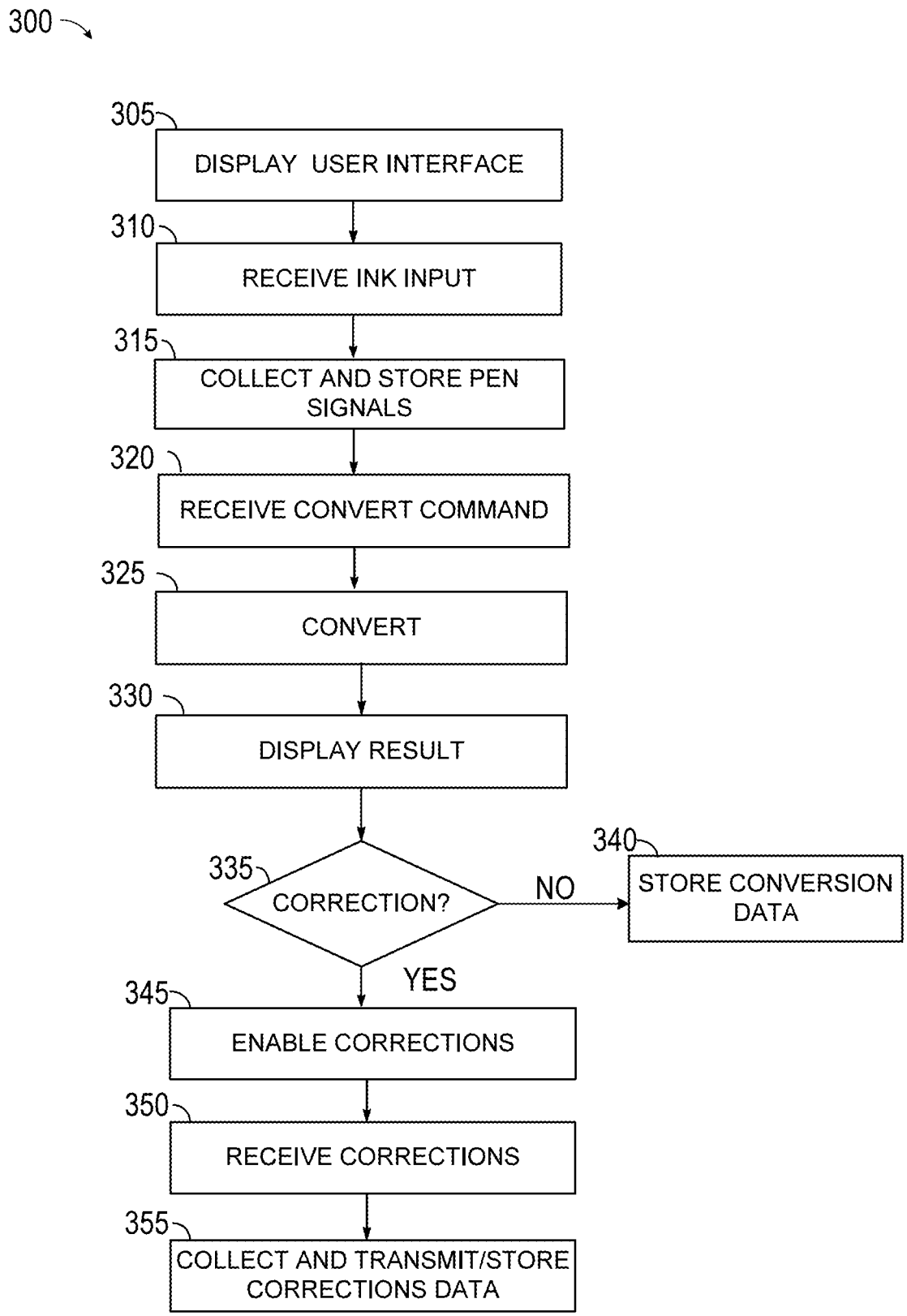
FIG. 3 is a flow diagram showing an example method for receiving, processing, converting and verifying digital ink input.

FIG. 3 is a flow diagram depicting an example method 300 for receiving, processing, converting and verifying digital ink input. At 305, the method 300 begins by displaying a digital ink enabled user interface screen such as the UI screen 100A of FIG. 1A. This may be initiated by for example opening an application or a document using an application that provides digital ink features. The screen may be displayed on any display device that is configured for use with a computing device running the application. In one implementation, the display device is a type of device configured for receiving digital ink input via a writing instrument such as a stylus.

After displaying the screen, method 300 may wait to receive some digital ink input, at 310. Upon receiving an indication that digital ink is being input, method 300 may begin collecting and storing pen signals for the entered digital ink. The pen signals may include for example direction of stroke, timing, velocity, position, tilt and/or pressure, among others. These signals may be collected via one or more sensors within the display device and/or other devices in communication with the display device and could be used in recognizing characters, as discussed further below. The signals may be collected in correspondence with the entered digital ink. For example, when the user draws the letter a, method 300 may collect all information relating to the shape of the character along with the pen signals when the character was being drawn together so that the information can be used to recognize the letter and to further train models that are used to recognize characters. All the collected information may then be stored locally and/or transmitted via a network to a digital ink conversion application for further analysis and processing. In one implementation, the collected information may be stored locally and transmitted in batches when needed (e.g., when a covert command is received).

Once digital ink input entry has started, method 300 may continue monitoring, collecting and storing the entered data and its related pen signals until a command to convert the data is received, at 320. The command may be received, for example, by receiving an indication the user has pressed a convert ink button (e.g., convert ink button 150 of FIG. 1B). Other methods of receiving the convert ink command are also possible.

When a signal to convert the digital ink is received, method 300 may proceed to convert one or more portions of the entered digital ink, at 325. The conversion process may involve use of one or more digital ink conversion applications which may be available locally and/or via a cloud service accessed through a network. In one implementation, a local digital ink conversion feature may be available in the user device for cases when the user is not connected to a network. Such a feature may provide some conversion capabilities but may not be as advanced as the cloud-based service. The local version application (and/or the cloud-based service when granted permission) may also learn each user's specific style of writing and apply that to recognize and convert the entered digital ink. The cloud-based service may collect information from numerous users who have provided permission to use their data to train the conversion models and as such may be able to provide more accurate conversions in some cases. Whether local or cloud-based, the conversion application may examine the digital ink input along with data collected in relation to the digital ink input and/or context gleaned from the type of document, the rest of the entries in the document (e.g., the topic of the document, the topic of the current paragraph and/or the current sentence, semantics, grammar, user's data entry history, and the like).

Once conversion of the entered digital ink is complete, method 300 may proceed to display the results, at 330. In one implementation, the results may be displayed via a split-screen display such as the screen 200 of FIG. 2 to enable the user to easily compare and correct any mistakes.

At this stage, method 300 may wait to determine if any corrections are desired. When it is determined, at 335, that no corrections are necessary, method 300 may store the conversion data with an indication that the conversion was performed correctly, at 340. This may be used in future conversions as confirmation that the digital ink input was correctly recognized. When it is determined, however, at 335, that one or more corrections are desired (e.g., by receiving an indication from the user via a user interface device), method 300 may enable the screen for receiving corrections, at 345. This may involve determining which type of input correction is selected (e.g., ink editing or text editing) and enabling the screen to receive and be responsive to the selected type of correction. For example, if digital ink correction is selected, the screen may allow the user to select and modify one or more portions of the digital ink input to correct any mistakes. In one implementation, in response to digital ink correction, the corrected input may automatically be reconverted to correct the mistake and display the corrected version on the screen. Once corrections are received, method 300 may proceed to collect the correction data for use in training the conversion models. The collected data may then be stored locally and/or transmitted to a cloud server for storage and analysis and use by the cloud-based conversion application. This collection data may be helpful in preventing future mistakes by for example correlating the received digital ink and any associated pen signals with the corrected character to avoid making the same misrecognition in the future.

Figure 4:
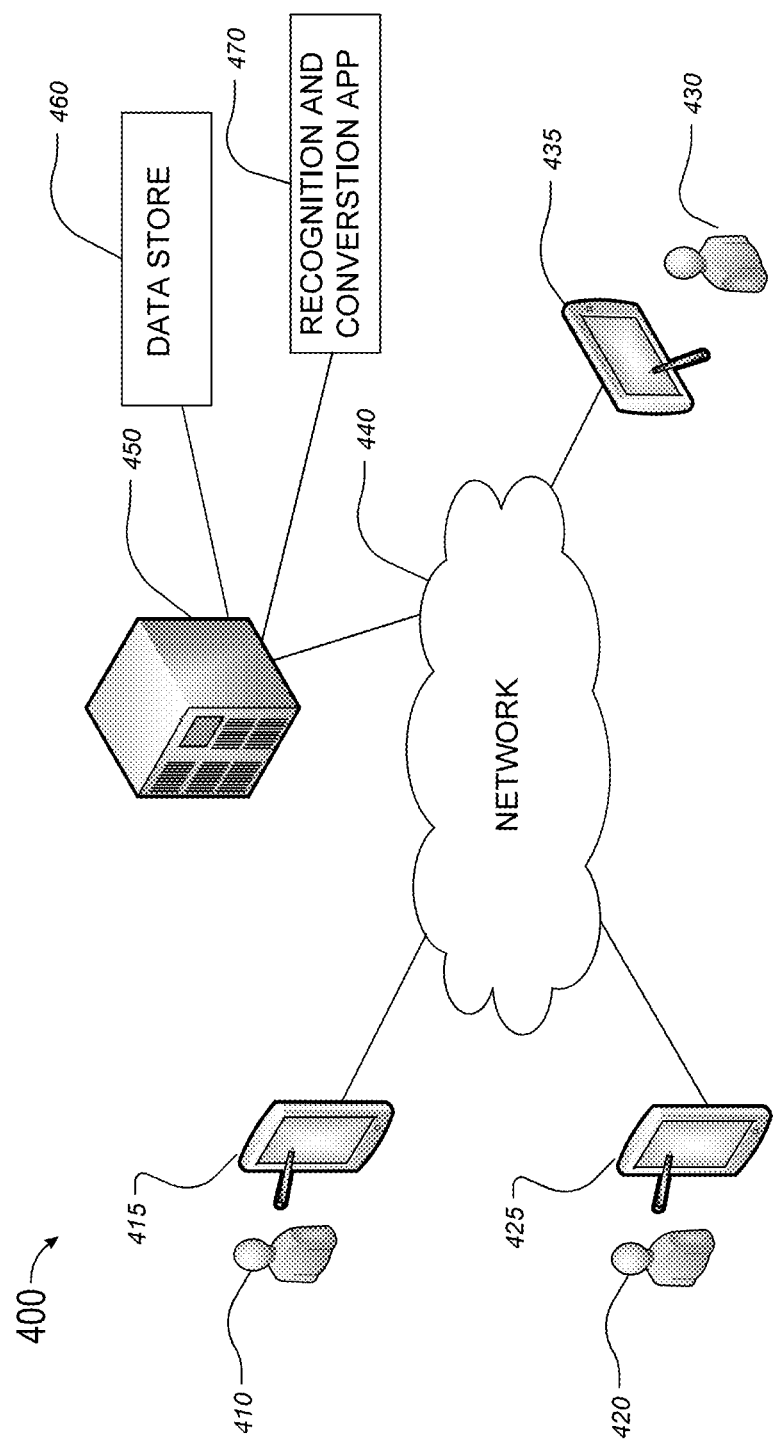
FIG. 4 depicts an example of a representative environment for receiving, processing, recognizing and converting digital ink input.

FIG. 4 illustrates an example system environment 400, upon which aspects of this disclosure may be implemented. In different implementations, the environment can include a plurality of computing device users, also referred to here as users. For example, a first user 410, a second user 420, and a third user 430 are depicted in FIG. 4, using respective devices 415, 425 and 435. One or more users can interact with or utilize an application presented via a user device. As the users utilize their respective devices to enter digital ink, convert, review and correct it, data relating to the entered digital ink (e.g. pen signals) may be collected by each respective device and may be transmitted to a server 450 via one or more network(s) 440. The sever 450 may include or be connected to a data store 460 which can be used to store the collected data. The collected data may be transmitted in batches at different times. For example, the collected data may be stored locally on each of the user devices and transmitted each time a conversion process is completed. The server 450 may also include and/or be connected to one or more digital ink recognition and conversion applications 470 for converting any digital ink entered in one of the devices 415, 425 and 435. Once the digital ink recognition and conversion applications 470 convert the digital ink input, they may transmit the converted characters to the respective user device which would enabling displaying them. Later, if the user of the device makes any corrections, data relating to the corrections may be transmitted back to the data store 460 and used to further train the digital ink recognition and conversion applications 470, thus creating a feedback loop.

The network 440 may be a wired or wireless network or a combination of wired and wireless networks. In one implementation, the server 450 may be configured to perform one or more steps of the methods disclosed herein via for example the digital ink conversion application. Alternatively, the one or more steps may be done by the devices 415, 425 and 435 connected locally or remotely to the network 130. In another configurations, some of the steps may be performed by the server 450, and some may be performed by the devices 415, 425 and 435.

The user devices 415, 425 and 435 may include any stationary or mobile computing devices configured to provide a user interface for interaction with a user and configured to communicate via the network 440. For example, the user devices may include workstations, desktops, laptops, tablets, smart phones, cellular phones, personal data assistants (PDA), printers, scanners, telephone, or any other device that can be used to interact with a user.

It should be noted that although the devices 415, 425 and 435 are shown as being connected to the network 130, they could be disconnected and operate independently from a network environment, at least temporarily. For example, a local digital ink application may be used to receive, process and convert the digital ink for one or more of the devices 415, 425 and 435.

As a general matter, the methods and systems described herein may include, or otherwise make use of, a machine-trained model to determine how to recognize and convert digital ink input. As an example, a system can be trained using data generated by machine learning (ML) model in order to identify patterns in digital ink input, determine associations between various entered digital ink inputs, associated pen signals, and/or recognized characters and corrections. Such determination may be made following the accumulation, review, and/or analysis of data from a large number of users over time, that may be configured to provide the ML algorithm (MLA) with an initial or ongoing training set. In addition, in some implementations, a user device can be configured to transmit data captured locally during use of digital ink to the cloud or the local ML program and provide supplemental training data that can serve to fine-tune or increase the effectiveness of the MLA. The supplemental data can also be used to facilitate identification of characters and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to patterns in user digital ink input, determine associations between various inputs and signals and/or recognize characters based on data collected during use of the system. In some implementations, machine learning techniques may generate one or more models for identifying and/or characterizing inputs based on a corpus of training data in the form of labeled or otherwise previously characterized data. Furthermore, the training data may be continually updated and one or more of the models used by the classification system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

Thus, in different implementations, a machine learning model can be developed that is configured to recognize with high confidence and precision characters input using digital ink. In some implementations, the ML model can obtain reinforcement signals to improve the model and better account for user intentions. As a preliminary modeling paradigm, some implementations can make use of one or more bootstrapping algorithms to provide approximations of these predictions.

In this manner, methods are presented for receiving, processing, converting, verifying and correcting digital ink input in a user-friendly manner. An improved user interface may be provided for receiving digital ink input which can receive all desired digital ink input before conversion takes place. A split-screen display may then be provided for verifying converted digital ink and making any desired corrections. The split-screen display may enable a user to compare each portion of the converted characters adjacent to its corresponding entered digital ink input. Any correction data may be collected and stored or transmitted to be used in training models that help provide digital ink conversion.

Figure 5:
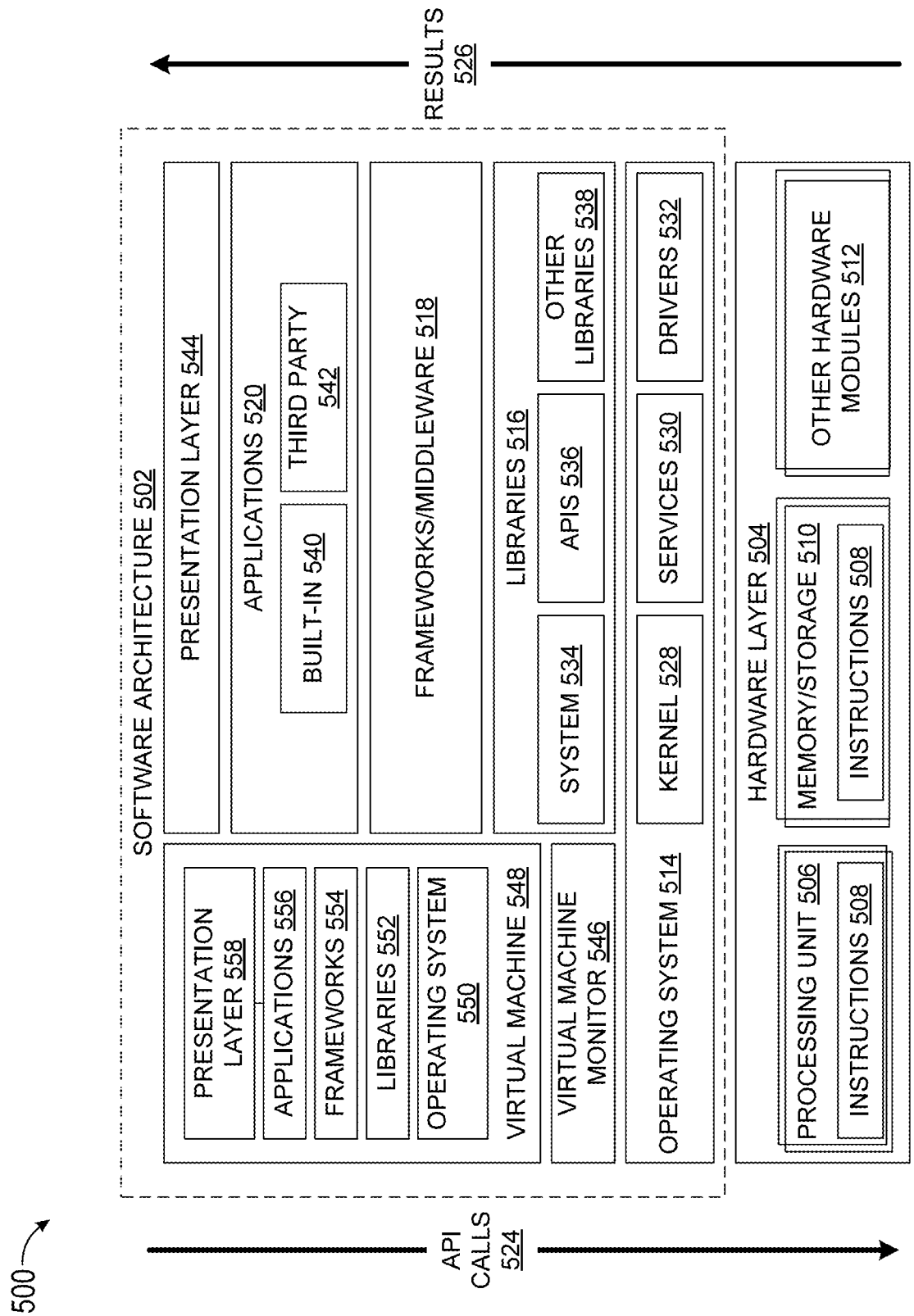
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
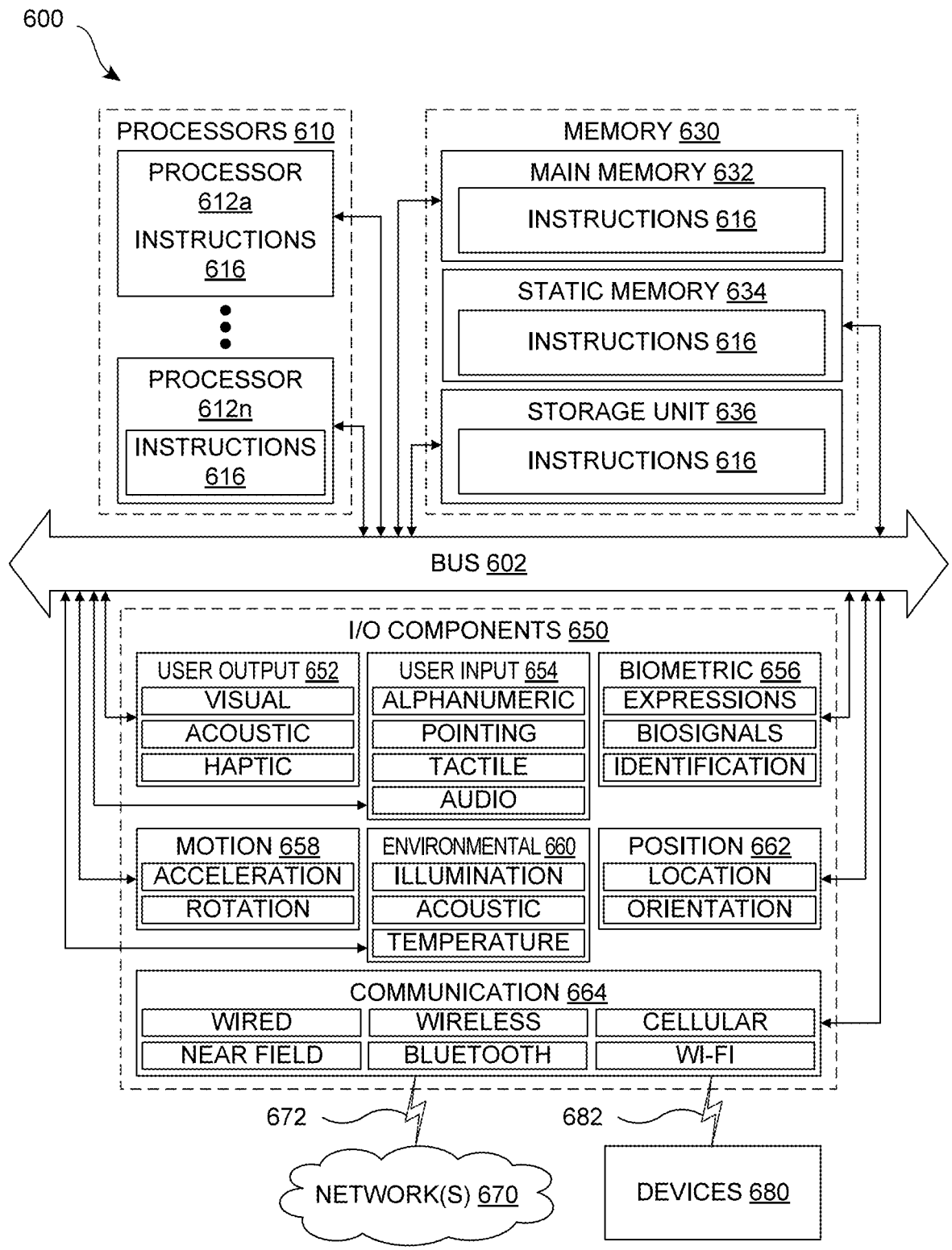
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" include a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   one or more processors; and
   a memory in communication with the one or more processors, the memory comprising executable instructions that, when executed by the one or more processors, cause the device to perform functions of:
   receiving digital ink input in a digital ink enabled document;
   collecting data relating to the received digital ink input;
   determining that digital ink input entry into the document is complete;

upon determining that digital ink input entry into the document is complete, recognizing the received digital ink input as one or more text characters based at least in part on the received digital ink input;

displaying the one or more recognized text characters as converted characters on a screen adjacent to the received digital ink input; and enabling corrections to be made to at least one of the converted characters or the received digital ink input to correct a misrecognized character, wherein determining that digital ink input entry into the document is complete includes receiving a user request inputted after completing the document.

2. The device of claim 1, wherein the executable instructions when executed by the one or more processors, further cause the device to perform functions of:

receiving an indication that a correction to the converted characters or the received digital ink input is needed;

receiving a modification to at least one of the converted characters or the received digital ink input;

collecting data relating to the modification; and storing the collected data for use in future character recognition.

3. The device of claim 1, wherein the converted characters are displayed on the screen adjacent to the received digital ink input to enable bulk comparison of the converted characters with all of the received digital ink input for verifying accuracy.

4. The device of claim 1, wherein the executable instructions when executed by the one or more processors, further cause the device to perform functions of receiving acceptance of the converted characters.

5. The device of claim 1, wherein the user request inputted after completing the document includes an indication that a user interface element has been invoked.

6. The device of claim 1, wherein the data relating to the received digital ink input includes at least one of direction of stroke, timing, velocity of stroke, writing instrument position, tilt and pressure.

7. The device of claim 1, wherein recognizing the received digital ink input as one or more text characters is done based at least in part on a context of the digital ink input.

8. A method for providing digital ink input processing comprising:

receiving digital ink input in a digital ink enabled document;

collecting data relating to the received digital ink input;

determining that digital ink input entry into the document is complete;

upon determining that digital ink input entry into the document is complete, recognizing the received digital ink input as one or more text characters based at least in part on the received digital ink input;

displaying the one or more recognized text characters as converted characters on a screen adjacent to the received digital ink input; and enabling corrections to be made to at least one of the converted characters or the received digital ink input to correct a misrecognized character, wherein determining that digital ink input entry into the document is complete includes receiving a user request inputted after completing the document.

9. The method of claim 8, further comprising:

receiving an indication that a correction to the converted characters or the received digital ink input is needed;

receiving a modification to at least one of the converted characters or the received digital ink input;

collecting data relating to the modification; and storing the collected data for use in future character recognition.

10. The method of claim 8, wherein the converted characters are displayed on the screen adjacent to the received digital ink input to enable bulk comparison of the converted characters with all of the received digital ink input for verifying accuracy.

11. The method of claim 8, further comprising receiving acceptance of the converted characters.

12. The method of claim 8, wherein the user request inputted after completing the document includes an indication that a user interface element has been invoked.

13. The method of claim 8, wherein the data relating to the received digital ink input includes at least one of direction of stroke, timing, velocity of stroke, writing instrument position, tilt and pressure.

14. A non-transitory computer readable medium on which are stored instructions that when executed cause a programmable device to:

receive digital ink input in a digital ink enabled document;

collect data relating to the received digital ink input;

determine that digital ink input entry into the document is complete;

upon determining that digital ink input entry into the document is complete, recognize the received digital ink input as one or more text characters based at least in part on the received digital ink input;

display the one or more recognized text characters as converted characters on a screen adjacent to the received digital ink input; and enable corrections to be made to at least one of the converted characters or the received digital ink input to correct a misrecognized character, wherein determining that digital ink input entry into the document is complete includes receiving a user request inputted after completing the document.

15. The non-transitory computer readable medium of claim 14, wherein the instructions further cause the programmable device to:

receive an indication that a correction to the converted characters or the received digital ink input is needed;

receive a modification to at least one of the converted characters or the received digital ink input;

collect data relating to the modification; and store the collected data for use in future character recognition.

16. The non-transitory computer readable medium of claim 14, wherein the converted characters are displayed on the screen adjacent to the received digital ink input to enable bulk comparison of the one or more recognized text characters with all of the received digital ink input for verifying accuracy.

17. The non-transitory computer readable medium of claim 14, wherein the data relating to the received digital ink input includes at least one of direction of stroke, timing, velocity of stroke, writing instrument position, tilt and pressure.

18. The non-transitory computer readable medium of claim 14, further comprising receiving acceptance of the converted characters.

19. The non-transitory computer readable medium of claim 14, further comprising receiving rejection of the converted characters.

20. The non-transitory computer readable medium of claim 14, wherein recognizing the received digital ink input as one or more text characters is done based at least in part on a context of the digital ink input.

* * * * *